(12) United States Patent
Dusija et al.

(10) Patent No.: US 9,037,902 B2
(45) Date of Patent: May 19, 2015

(54) FLASH MEMORY TECHNIQUES FOR RECOVERING FROM WRITE INTERRUPT RESULTING FROM VOLTAGE FAULT

(71) Applicant: SANDISK TECHNOLOGIES INC., Plano, TX (US)

(72) Inventors: Gautam Dusija, San Jose, CA (US); Jianmin Huang, San Carlos, CA (US); Chris N. Avila, Saratoga, CA (US); Grishma S. Shah, Milpitas, CA (US); Yi-Chieh Chen, San Jose, CA (US); Alexander K. Mak, Mountain View, CA (US); Farookh Moogat, Fremont, CA (US)

(73) Assignee: SanDisk Technologies Inc., Plano, TX (US)

( * ) Notice: Subject to any disclaimer, the term of this patent is extended or adjusted under 35 U.S.C. 154(b) by 258 days.

(21) Appl. No.: 13/841,180

(22) Filed: Mar. 15, 2013

(65) Prior Publication Data
US 2014/0281683 A1    Sep. 18, 2014

(51) Int. Cl.
*G06F 11/00* (2006.01)
*G06F 11/10* (2006.01)
*G06F 11/07* (2006.01)
*G06F 11/14* (2006.01)
*G06F 11/16* (2006.01)

(52) U.S. Cl.
CPC ........ *G06F 11/1068* (2013.01); *G06F 11/0751* (2013.01); *G06F 11/1448* (2013.01); *G06F 11/1458* (2013.01); *G06F 11/1666* (2013.01); *G06F 11/0754* (2013.01)

(58) Field of Classification Search
CPC ............ G06F 11/1068; G06F 11/0751; G06F 11/0754; G06F 11/1666; G06F 11/1448; G06F 11/1458
USPC ........................................................ 714/6.11
See application file for complete search history.

(56) References Cited

U.S. PATENT DOCUMENTS

| 5,798,968 A | 8/1998 | Lee et al. |
| 5,838,894 A | 11/1998 | Horst |
| 5,862,074 A | 1/1999 | Park |

(Continued)

FOREIGN PATENT DOCUMENTS

WO    WO 2009/020845    2/2009

OTHER PUBLICATIONS

U.S. Appl. No. 13/401,494, filed Feb. 21, 2012, Lee et al.

(Continued)

*Primary Examiner* — Bryce Bonzo
*Assistant Examiner* — Anthony J Amoroso
(74) *Attorney, Agent, or Firm* — Davis Wright Tremaine LLP

(57) ABSTRACT

Techniques, related to a flash memory device having a non-volatile memory array (NVM), for recovering from a write interrupt resulting from host-supplied memory voltage fault are disclosed. A memory controller is configured to control a response to an occurrence of the write-interrupt, the response including writing to the NVM, after the memory voltage is verified as being within an acceptable range, one or more of a safe copy of a portion of a first sector of upper-page data and a safe copy of a portion of a second sector of lower-page data, and terminating the write interrupt. Terminating the write-interrupt may include receiving new data from the host while avoiding sending an error message to the host.

20 Claims, 9 Drawing Sheets

(56) References Cited

U.S. PATENT DOCUMENTS

| | | |
|---|---|---|
| 5,867,429 A | 2/1999 | Chen et al. |
| 5,890,192 A | 3/1999 | Lee et al. |
| 6,246,626 B1 | 6/2001 | Roohparvar |
| 6,266,273 B1 | 7/2001 | Conley et al. |
| 6,763,424 B2 | 7/2004 | Conley |
| 6,937,510 B2 | 8/2005 | Hosano et al. |
| 7,061,798 B2 | 6/2006 | Chen et al. |
| 7,120,051 B2 | 10/2006 | Gorobets et al. |
| 7,158,421 B2 | 1/2007 | Li et al. |
| 7,193,896 B2 | 3/2007 | Shiga |
| 7,315,916 B2 | 1/2008 | Bennett et al. |
| 7,409,473 B2 | 8/2008 | Conley et al. |
| 7,412,560 B2 | 8/2008 | Smith et al. |
| 7,447,078 B2 | 11/2008 | Li |
| 7,463,521 B2 | 12/2008 | Li |
| 7,475,174 B2 | 1/2009 | Chow et al. |
| 7,480,181 B2 | 1/2009 | Li |
| 7,490,283 B2 | 2/2009 | Gorobets et al. |
| 7,502,260 B2 | 3/2009 | Li et al. |
| 7,505,320 B2 | 3/2009 | Li |
| 7,586,784 B2 | 9/2009 | Roohparvar |
| 7,594,157 B2 * | 9/2009 | Choi et al. .................... 714/764 |
| 7,755,950 B2 | 7/2010 | Yu et al. |
| 7,761,740 B2 | 7/2010 | Kern et al. |
| 7,827,348 B2 | 11/2010 | Lee et al. |
| 7,873,778 B2 | 1/2011 | Choi et al. |
| 7,934,074 B2 | 4/2011 | Lee et al. |
| 7,945,825 B2 | 5/2011 | Cohen et al. |
| 8,046,528 B2 | 10/2011 | Chu et al. |
| 8,132,045 B2 | 3/2012 | Avila et al. |
| 8,134,872 B2 | 3/2012 | Roohparvar |
| 8,307,241 B2 | 11/2012 | Avila et al. |
| 8,416,621 B2 * | 4/2013 | Yu et al. .................... 365/185.05 |
| 8,792,273 B2 * | 7/2014 | Ellis et al. ................ 365/185.03 |
| 2003/0137874 A1 | 7/2003 | Furukawa |
| 2004/0188710 A1 | 9/2004 | Koren et al. |
| 2005/0141312 A1 | 6/2005 | Sinclair et al. |
| 2005/0204187 A1 | 9/2005 | Lee et al. |
| 2006/0031593 A1 | 2/2006 | Sinclair |
| 2006/0034120 A1 * | 2/2006 | Isobe et al. ............... 365/185.18 |
| 2006/0136656 A1 | 6/2006 | Conley et al. |
| 2006/0184720 A1 | 8/2006 | Sinclair et al. |
| 2006/0198202 A1 | 9/2006 | Erez |
| 2006/0271748 A1 | 11/2006 | Jain et al. |
| 2007/0101096 A1 | 5/2007 | Gorobets |
| 2007/0140036 A1 | 6/2007 | Noguchi et al. |
| 2008/0016269 A1 | 1/2008 | Chow et al. |
| 2008/0183949 A1 | 7/2008 | Ly et al. |
| 2008/0195804 A1 | 8/2008 | Kim et al. |
| 2008/0250195 A1 | 10/2008 | Chow et al. |
| 2008/0253184 A1 | 10/2008 | Sakurai et al. |
| 2008/0316816 A1 | 12/2008 | Lin |
| 2009/0276474 A1 | 11/2009 | Sela et al. |
| 2010/0030951 A1 | 2/2010 | Kim |
| 2010/0074012 A1 | 3/2010 | Park et al. |
| 2010/0257308 A1 | 10/2010 | Hsu et al. |
| 2010/0318721 A1 | 12/2010 | Avila et al. |
| 2010/0318839 A1 | 12/2010 | Avila et al. |
| 2012/0170380 A1 | 7/2012 | Kumazaki et al. |

OTHER PUBLICATIONS

U.S. Office Action dated Jan. 5, 2011 issued in U.S. Appl. No. 12/485,827.
U.S. Final Office Action dated May 23, 2011 issued in U.S. Appl. No. 12/485,827.
U.S. Notice of Allowance dated Oct. 28, 2011 issued in U.S. Appl. No. 12/485,827.
U.S. Office Action dated Oct. 31, 2011 issued in U.S. Appl. No. 12/487,063.
U.S. Final Office Action dated Mar. 15, 2012 issued in U.S. Appl. No. 12/487,063.
U.S. Office Action dated Nov. 28, 2012 issued in U.S. Appl. No. 12/487,063.
U.S. Office Action dated Mar. 27, 2012 issued in U.S. Appl. No. 12/485,846.
U.S. Notice of Allowance dated Jul. 11, 2012 issued in U.S. Appl. No. 12/485,846.

* cited by examiner

FLASH MEMORY TECHNIQUES FOR RECOVERING FROM WRITE INTERRUPT RESULTING FROM VOLTAGE FAULT

TECHNICAL FIELD

This disclosure relates generally to memory devices, and more particularly to preservation of data to be written to a non-volatile memory array when a write operation is interrupted by a voltage fault in host-provided power.

DESCRIPTION OF THE RELATED TECHNOLOGY

Nonvolatile memory systems, such as flash memory, have been widely adopted for use in host systems such as computers, personal electronic devices, cameras, and other consumer and industrial systems. Examples of nonvolatile memory systems include memory cards, USB flash drives, and removable SSDs. Nonvolatile memory systems may be embedded in a large variety of host systems. For example, the nonvolatile memory system may be used with a personal computer, for example, as a Solid State Drive (SSD). Some nonvolatile memory systems may be detachably connected to a host system and may be interchanged between a number of different host systems, each host having different characteristic processing and voltage regulation capabilities.

Electronic circuit cards, including non-volatile memory cards, have been commercially implemented according to a number of well-known standards. Memory cards are used with personal computers, cellular telephones, personal digital assistants (PDAs), digital still cameras, digital movie cameras, portable audio players and other host electronic devices for the storage of large amounts of data. Such cards usually contain a re-programmable non-volatile semiconductor memory cell array along with a controller that controls and supports operation of the memory cell array and interfaces with a host to which the card is connected. Several of the same type of card may be interchanged in a host card slot designed to accept that type of card. Memory card standards include PC Card, CompactFlash™ card (CF™ card), SmartMedia™ card, MultiMediaCard (MMC™), Secure Digital (SD) card, miniSD™ card, Subscriber Identity Module (SIM), Memory Stick™, Memory Stick Duo card and microSD/TransFlash™ memory module standards.

Binary and Multi-Level Cell (MLC) NAND Flash Memory are forms of non-volatile memory (NVM) that are capable of high data storage densities and high performance. Typically a "page" or group of bits at a time is written to the NVM, in support of which process the host is required to supply a voltage to the flash memory that is regulated within a specified voltage range. A voltage fault, for example a sag or "droop" in the host-supplied memory voltage below a specified lower voltage limit may occur from time to time. If a voltage fault occurs during a write cycle/program operation, something less than all of the bits of the page may be programmed successfully in the NVM. When the page containing unsuccessfully programmed bits is read back, some bits may have the new value, some will have the old value and, as a result, the page data may be corrupted. To avoid such data corruption, it is known to react to a voltage droop by invoking a write interrupt procedure and sending an error message to the host, which is then required to resend the page of data, after the voltage droop has been corrected.

Improved techniques that prevent data corruption, while minimizing demands on a host's processing and voltage regulation capabilities are desirable.

SUMMARY

This disclosure provides examples of circuits, devices, systems, and methods for providing a safe recovery from a write interrupt resulting from a fault in host-supplied voltage. In one aspect, a memory device includes a memory controller, a non-volatile memory array for storing page data, an on-chip cache, and a host interface. The host interface is communicatively coupled with the memory controller and the non-volatile memory array and may be configured to accept a memory voltage supplied by a host for writing data to the non-volatile memory array. The page data may include upper-page data and lower-page data. The on-chip cache is configured to concurrently retain, until a first sector of upper-page data and a second sector of lower-page data are confirmed as written, a safe copy of at least a portion of the first sector of upper-page data and a safe copy of at least a portion of the second sector of lower-page data to be written to a respective group of cells of the memory array. The memory controller is configured to control a response to an occurrence of a write-interrupt resulting from a voltage fault in the memory voltage. The response includes writing to the non-volatile memory array, after the memory voltage is verified as being within an acceptable range, one or more of the safe copy of the portion of the first sector of upper-page data and the safe copy of the portion of the second sector of lower-page data; and In some implementations, the response avoids outputting of an error signal to the host. In some implementations, terminating the write-interrupt includes receiving new data from the host.

In some implementations, the voltage fault may be a voltage value below a minimum specified regulated memory voltage and above a reset voltage value. The response, in some implementations, further includes verifying, prior to writing to the non-volatile memory array, that a hard reset has not occurred. The response may further include verifying, prior to writing to the non-volatile memory array, that the memory voltage is above the minimum specified regulated memory voltage.

In some implementations, the non-volatile memory is configured as a single level cell memory. In other implementations, the non-volatile memory may be configured as a multi-level cell memory, and the page data may further include middle-page data.

In some implementations, the memory device includes a page buffer, including an upper page data latch and a lower page data latch communicatively coupled to the non-volatile memory array, and an external data latch communicatively coupled to the memory controller and the page buffer.

In some implementations, the response further includes reconstructing a full page of data from (i) one or both of the safe copy of the portion of the first sector of upper-page data and the safe copy of the portion of the second sector of lower-page data and (ii) a partial page written to the non-volatile memory array.

In another aspect, a method for controlling data transfer from a host to a nonvolatile memory array includes: receiving page data, the page data comprising lower-page data and upper-page data from a host; maintaining at least some of the lower-page data and the upper-page data in an on-chip cache configured to concurrently retain, until a first sector of upper-page data and a second sector of lower-page data are confirmed as written, a safe copy of at least a first portion of the first sector of upper-page data and a safe copy of at least a portion of the second sector of lower-page data to be written to a respective group of cells of the memory array; accepting, at a host interface, a memory voltage supplied by the host for writing data to the non-volatile memory array, the host interface communicatively coupled with the memory controller and the non-volatile memory array; sensing an occurrence of a write-interrupt resulting from a voltage fault in the memory voltage and, in response to the occurrence, writing to the non-volatile memory array, after the memory voltage is verified as being within an acceptable range, one or more of the safe copy of the portion of the first sector of upper-page data and the safe copy of the portion of the second section of lower-page data; and terminating the write-interrupt.

In yet another aspect, a non-transitory computer-readable storage medium having stored thereon instructions which, when executed by a controller, cause the controller to perform operations, the operations including: receiving page data, the page data comprising lower-page data and upper-page data from a host; maintaining at least some of the lower-page data and the upper-page data in an on-chip cache configured to concurrently retain, until a first sector of upper-page data and a second sector of lower-page data are confirmed as written, a safe copy of at least a first portion of the first sector of upper-page data and a safe copy of at least a portion of the second sector of lower-page data to be written to a respective group of cells of the memory array; accepting, at a host interface, a memory voltage supplied by the host for writing data to the non-volatile memory array, the host interface communicatively coupled with the memory controller and the non-volatile memory array; sensing an occurrence of a write-interrupt resulting from a voltage fault in the memory voltage and, in response to the occurrence, writing to the non-volatile memory array, after the memory voltage is verified as being within an acceptable range, one or more of the safe copy of the portion of the first sector of upper-page data and the safe copy of the portion of the second section of lower-page data; and terminating the write-interrupt.

BRIEF DESCRIPTION OF THE DRAWINGS

Like reference numbers and designations in the various drawings indicate like elements.

DETAILED DESCRIPTION

This disclosure provides examples of circuits, devices, systems, and methods for providing a safe recovery from a write interrupt that results from a fault in voltage supplied to a flash memory by a host. Particular implementations described herein relate to circuits, devices, systems, and methods that reduce a housekeeping burden on a host. A flash memory system, instead of merely returning an error signal to the host in the event of a write interrupt that results from a voltage fault in a host supplied memory voltage, is configured to write cached data to the flash memory after the host-supplied voltage is verified as being within an acceptable range. In an embodiment, the write-interrupt is then terminated, and the flash memory resumes receiving new data from the host while avoiding outputting of an error signal to the host.

The circuits described herein can be utilized in a variety of applications. In some implementations, the circuits described herein are used in digital electronic devices or systems. For example, in some implementations, the circuits described herein can be used in a memory device. For example, the circuits can be used in solid state memory devices such as memory cards, USB flash drives, and removable SSDs. In some implementations, the circuits can be input/output I/O circuits (or interfaces) for a controller, such as a memory controller. In some implementations, the memory controller can be used in a host interface for a memory card such as, for example, a PC Card, a compact flash (CF™) card, a SmartMedia™ card, a MultiMediaCard (MMC™), a Secure Digital (SD) card, a mini or micro SD™ card, a SIM card, a Memory Stick™ card, a Memory Stick Duo card, TransFlash™ card, a Compact Flash card, or an iNAND card.

Although each of these cards may have a unique mechanical and/or electrical interface according to its standardized specifications, the flash memory system included in each may be similar. These cards are all available from the assignee of the present application which also provides a line of flash drives under its Cruzer trademark, such flash drives being hand held memory systems in small packages that have a Universal Serial Bus (USB) plug for connecting with a host by plugging into the host's USB receptacle. Each of these memory cards and flash drives includes a controller that interfaces with a respective host and controls operation of the flash memory within the card or device.

Generally, various implementations described herein can be used in any memory card or flash memory device in which it is desirable to minimize demands on a host's processing and voltage regulation capabilities.

Figure 1:
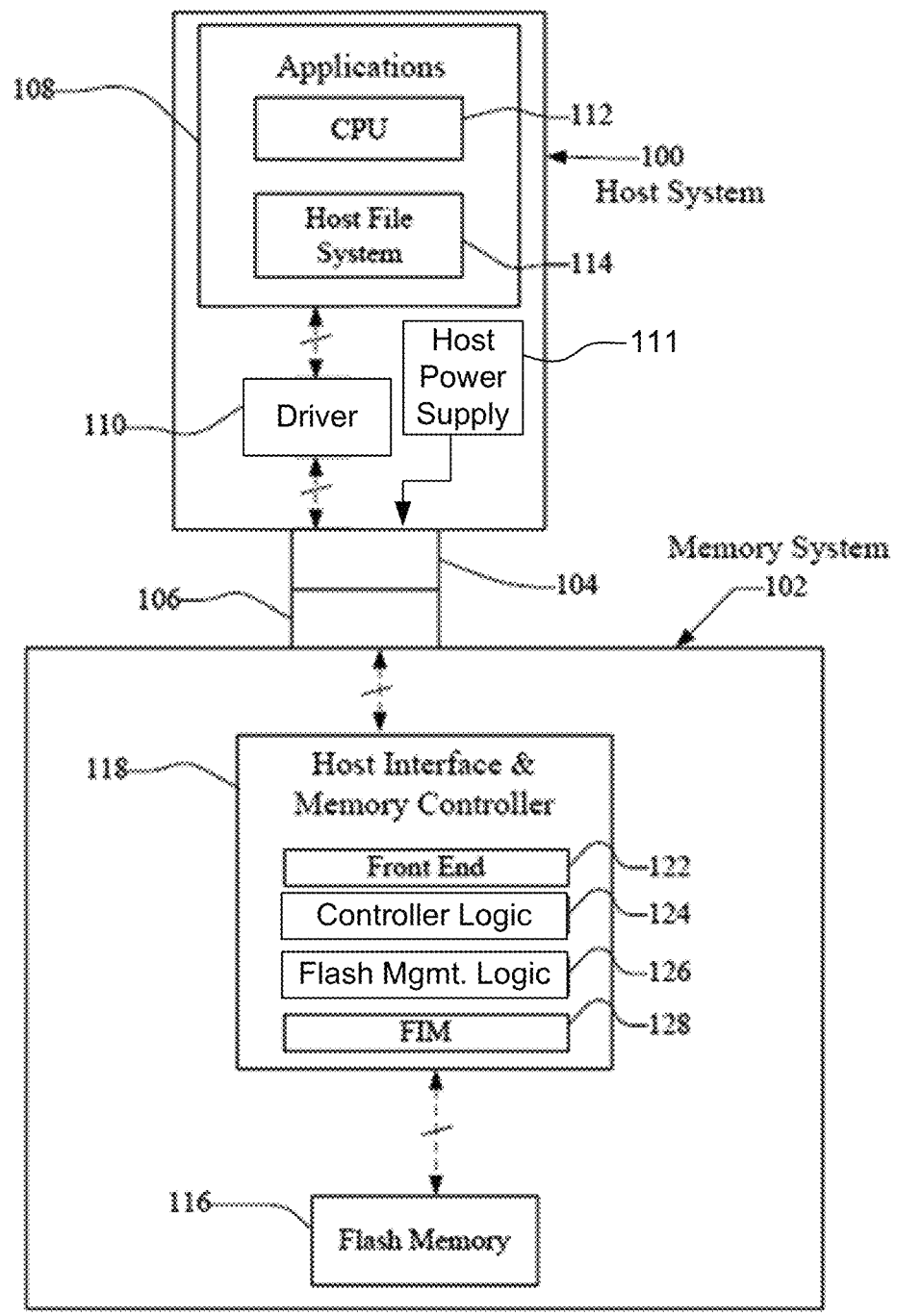
FIG. 1 is a block diagram a flash memory system that may be suitable for use in implementing aspects of the invention.

A flash memory system that may be suitable for use in implementing aspects of the invention is shown in FIGS. 1-5. A host system 100 of FIG. 1 writes data into and retrieves data from memory system 102. Memory system 102 may be in the form of a flash memory card that is removably connected to the host through mating parts 104 and 106 of a mechanical and electrical connector as illustrated in FIG. 1. Alternatively, memory system 102 may be embedded within host system 100, such as in the form of a solid state disk (SSD) drive installed in a personal computer. A flash memory configured for use as an internal or embedded SSD drive may look similar to the schematic of FIG. 1, with one difference being the location of memory system 102 internal to host system 100. SSD drives may be in the form of discrete modules that are drop-in replacements for rotating magnetic disk drives.

Host system 100 may include host power supply 111 that supplies a voltage input to memory system 102. For example, memory system 102 may require a voltage input to be supplied by host power supply 111 that is regulated in the range of 2.7 to 3.6 volts.

Host systems that may use SSDs, memory cards and flash drives are many and varied. They include personal computers (PCs), such as desktop or laptop and other portable computers, tablet computers, cellular telephones, smartphones, personal digital assistants (PDAs), digital still cameras, digital movie cameras, and portable media players. For portable memory card applications, a host may include a built-in receptacle for one or more types of memory cards or flash drives, or a host may require adapters into which a memory card is plugged. The memory system may include its own memory controller and drivers but there may also be some memory-only systems that are instead controlled by software executed by the host to which the memory is connected. In some memory systems containing the controller, especially those embedded within a host, the memory, controller and drivers are often formed on a single integrated circuit chip.

The host system 100 of FIG. 1 may be viewed as having two major parts, insofar as memory system 102 is concerned, made up of a combination of circuitry and software. More particularly, host system 100 may include applications portion 108 and a driver portion 110 that interfaces with the memory 102. Applications portion 108 may include a processor (CPU) 112 and a host file system 114. In a PC, for example, the applications portion 108 may include CPU 112 running word processing, graphics, control or other application software. In a camera, cellular telephone or other host system 100 that is primarily dedicated to performing a single set of functions, the applications portion 108 may include the software that operates the camera to take and store pictures, the cellular telephone to make and receive calls, and the like.

Memory system 102 may include non-volatile memory, such as flash memory 116, and a host interface and memory controller 118 that both interfaces with host system 100 and controls flash memory 116. Host interface and memory controller 118 may convert between logical addresses of data used by host 100 and physical addresses of the flash memory 116 during data programming and reading. Functionally, host interface and memory controller 118 may include a front end 122 that interfaces with the host system, controller logic 124 for coordinating operation of the memory 116, flash management logic 126 for internal memory management operations such as garbage collection, and one or more flash interface modules (FIMs) 128 to provide a communication interface between the controller with the flash memory 116.

Figure 2:
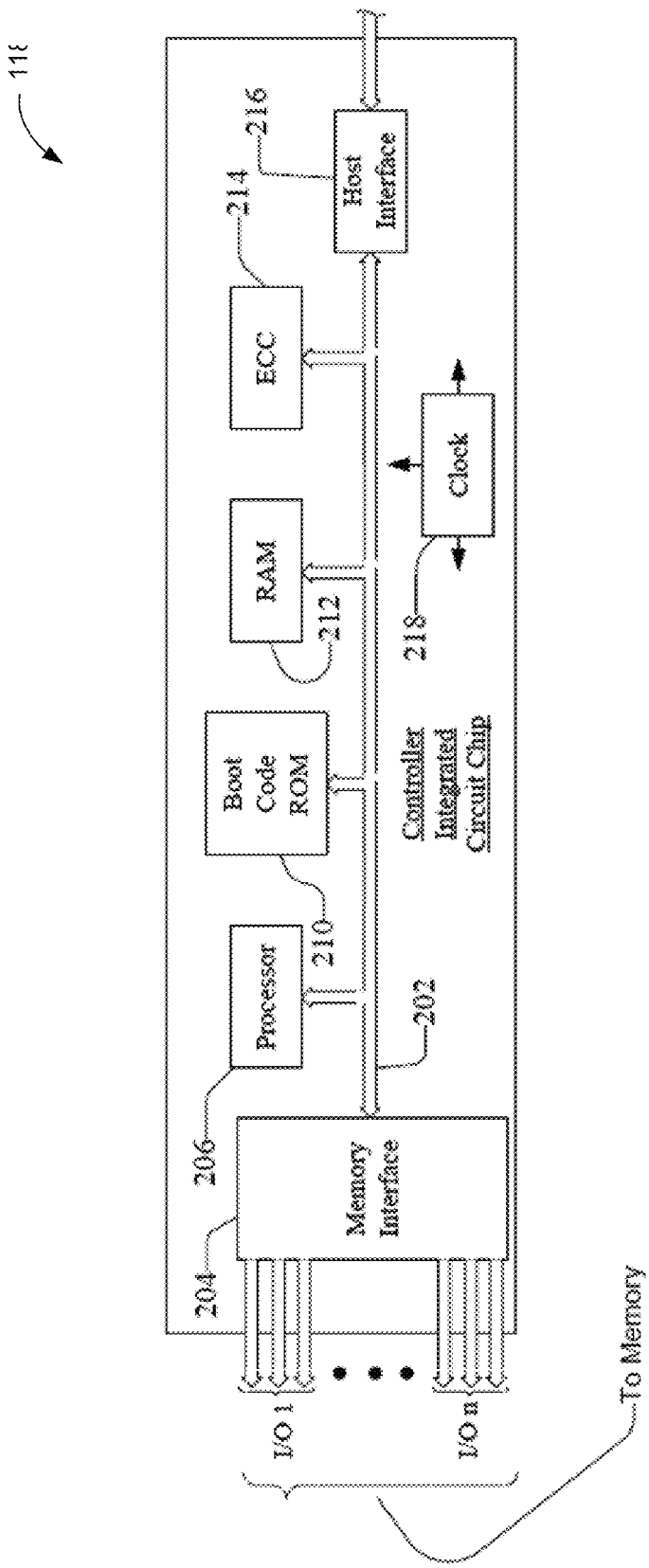
FIG. 2 is a block diagram a flash memory system that may be suitable for use in implementing aspects of the invention.

Host interface and memory controller 118 may be implemented on a single integrated circuit chip, such as an application specific integrated circuit (ASIC) such as shown in FIG. 2. Processor 206 of host interface and memory controller 118 may be configured as a multi-thread processor capable of communicating via a memory interface 204 having I/O ports for each memory bank in the flash memory 116. Host interface and memory controller 118 may include an internal clock 218. Processor 206 may communicate with an error correction code (ECC) module 214, a RAM buffer 212, a host interface 216, and boot code ROM 210 via an internal data bus 202.

ROM 210 may be used to initialize memory system 102, including flash memory 116. Memory system 102 may be referred to as a card. ROM 210 in FIG. 2 may be a region of read only memory whose purpose is to provide boot code to the RAM for processing a program, such as the initialization and booting of memory system 102.

Figure 3:
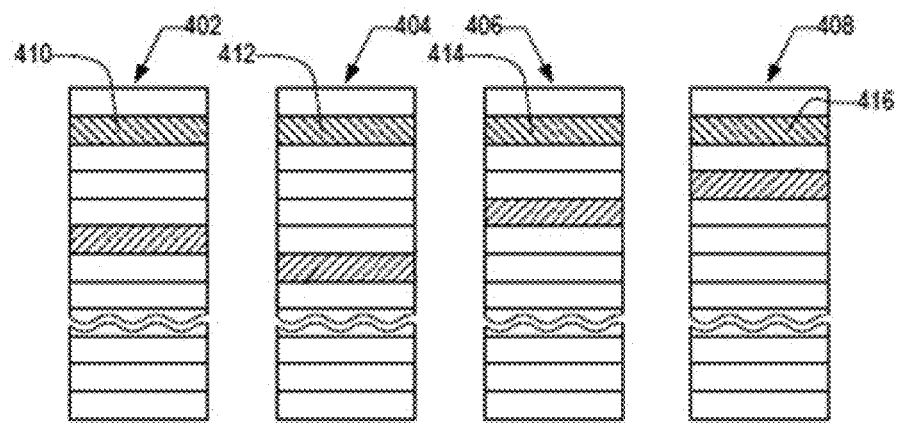
FIG. 3 is an example physical memory organization of the system of FIG. 1.
Figure 4:
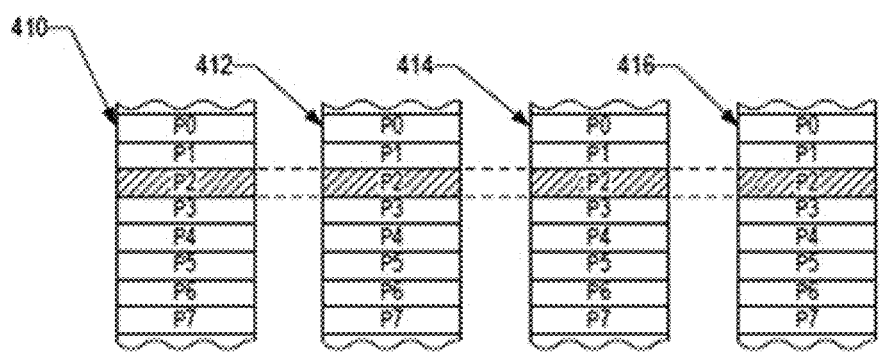
FIG. 4 is an expanded view of a portion of the physical memory of FIG. 3.

FIG. 3 conceptually illustrates an organization of the flash memory 116 (FIG. 1) as a cell array. The flash memory 116 may include multiple memory cell arrays which are each separately controlled by a single or multiple memory controllers 118. In the illustrated embodiment, four planes or sub-arrays 402, 404, 406, and 408 of memory cells are illustrated as an example, however one, two, eight, sixteen or more planes or sub-arrays may be contemplated. The planes or sub-arrays may be configured on a single integrated memory cell chip, or on two or more chips (with multiple planes on each chip). The planes may be individually divided into groups of memory cells that form the minimum unit of erase, hereinafter referred to as blocks. Blocks of memory cells are shown in FIG. 4 by rectangles, such as blocks 410, 412, 414, and 416, located in respective planes 402, 404, 406, and 408. There can be any number of blocks in each plane. Certain blocks may be reserved as safe zone blocks (SZBs) that are protected blocks for protecting data that is written to predetermined risk zones, such as a lower page.

The individual blocks are in turn divided for operational purposes into pages of memory cells, as illustrated in FIG. 4. The memory cells of each of the blocks 410, 412, 414, and 416, for example, are each divided into eight pages P0-P7. Alternatively, there may be 16, 32 or more pages of memory cells within each block. The page is the unit of data programming and reading within a block, containing the minimum amount of data that are programmed or read at one time.

The memory cells may be operated to store two levels of charge so that a single bit of data is stored in each cell. This is typically referred to as a binary or single level cell (SLC) memory. Alternatively, the memory cells may be operated to store more than two detectable levels of charge in each charge storage element or region, thereby to store more than one bit of data in each. This latter configuration is referred to as multi level cell (MLC) memory. Both types of memory cells may be used in a memory, for example binary flash memory may be used for caching data and MLC memory may be used for longer term storage. The charge storage elements of the memory cells are most commonly conductive floating gates but may alternatively be non-conductive dielectric charge trapping material.

In implementations of MLC memory operated to store two bits of data in each memory cell, each memory cell is configured to store four levels of charge corresponding to values of "11," "01," "10," and "00." Each bit of the two bits of data may represent a page bit of a lower page or a page bit of an upper page, where the lower page and upper page span across a series of memory cells sharing a common word line. Typically, the less significant bit of the two bits of data represents a page bit of a lower page and the more significant bit of the two bits of data represents a page bit of an upper page.

Figure 5:
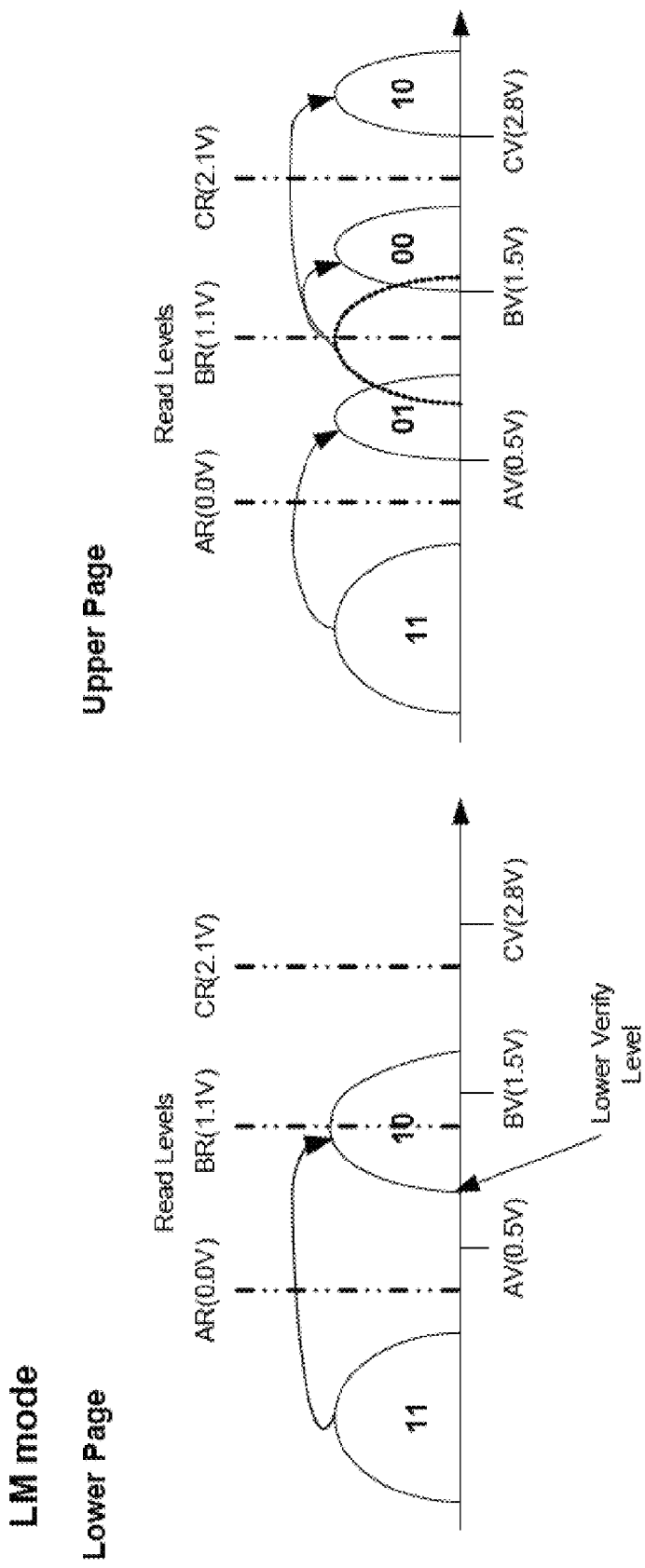
FIG. 5 is a diagram illustrating charge levels in a multi-level cell memory operated to store two bits of data in a memory cell.

FIG. 5 illustrates one implementation of the four charge levels used to represent two bits of data in a memory cell. FIG. 5 is labeled as LM mode which may be referred to as lower at middle mode and will further be described below regarding the lower at middle or lower-middle intermediate state. The LM intermediate state may also be referred to as a lower page programmed stage. A value of "11" corresponds to an un-programmed state of the memory cell. When programming pulses are applied to the memory cell to program a page bit of the lower page, the level of charge is increased to represent a value of "10" corresponding to a programmed state of the page bit of the lower page. The lower page may be considered a logical concept that represents a location on a multi-level cell (MLC). If the MLC is two bits per cell, a logical page may include all the least significant bits of the cells on the wordline that are grouped together. In other words, the lower page is the least significant bits.

For a page bit of an upper page, when the page bit of the lower page is programmed (a value of "10"), programming pulses are applied to the memory cell for the page bit of the upper page to increase the level of charge to correspond to a value of "00" or "10" depending on the desired value of the page bit of the upper page. However, if the page bit of the lower page is not programmed such that the memory cell is in an un-programmed state (a value of "11"), applying programming pulses to the memory cell to program the page bit of the upper page increases the level of charge to represent a value of "01" corresponding to a programmed state of the page bit of the upper page.

Whether the memory cells are configured for SLC storage or MLC storage, data may be corrupted in the event of a write-interrupt resulting from a voltage fault in the host-supplied memory voltage received from host power supply 111 (FIG. 1). The voltage fault may be, for example, a "droop" in the memory voltage such that, instead of complying with a lower voltage limit of 2.7 volts, for example, the memory voltage sags, or droops, to a value less than 2.7 volts. Because such voltage droops are known to increase the risk of data corruption during a data write operation, memory system 102 may be configured to execute a write interrupt procedure. In the absence of the present teachings, the write interrupt procedure includes, or is accompanied by, steps of: interrupting receipt of data to be written from host system 100 and transmitting an error message from memory system 102 to host system 100. Subsequently, host system 100 may be required to correct the voltage fault and/or verify that the voltage fault no longer exists, and then resend at least one page of data that was in the process of being written or programmed to the memory system 102 prior to occurrence of the voltage droop.

Figure 6:
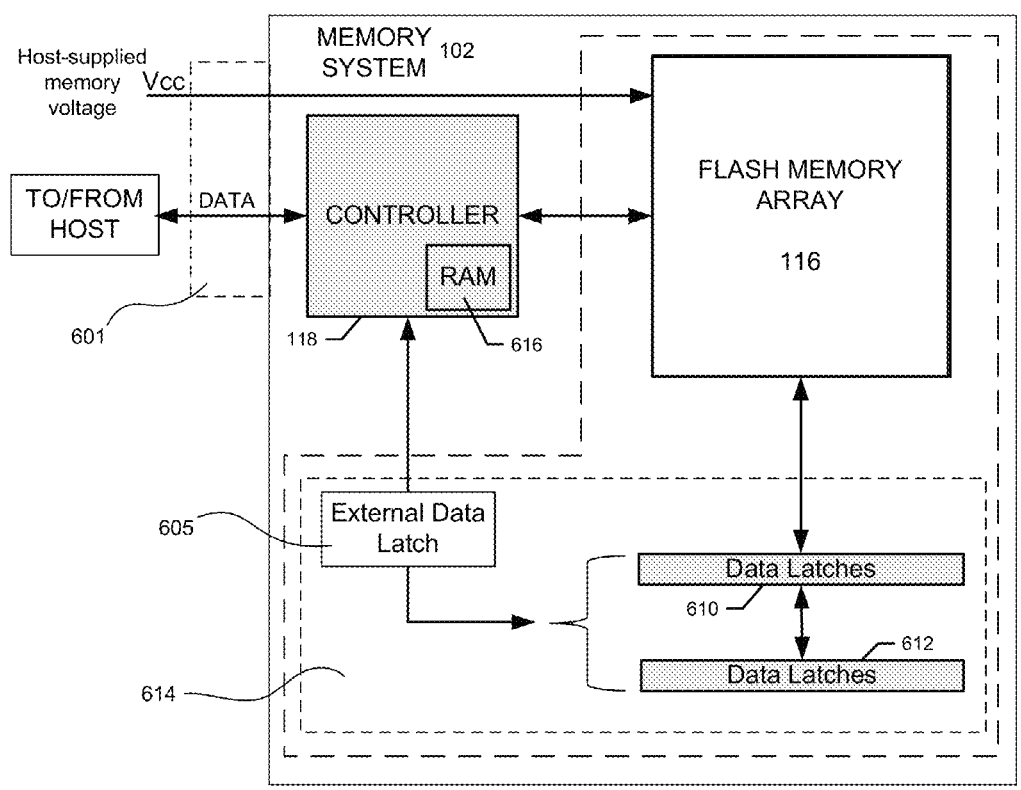
FIG. 6 is a block diagram of an example of a flash memory system according to an embodiment.

Features of the presently disclosed techniques may be better understood by referring first to FIG. 6. As described above, memory system 102 includes controller 118 that manages communication with the host and also manages how data is stored in flash memory 116. Flash memory 116 may be a non-volatile memory array configured to store upper page data, lower page data, and, in some embodiments, middle page data. FIG. 6 shows the controller 118 on a separate chip to flash memory 116, though in some embodiments, the controller may be on the same chip as the controller.

In the illustrated embodiment, host interface 601 is disposed between memory system 102 and the host (not illustrated). Host interface 601 may be communicatively coupled with controller 118 and flash memory 116. Host interface 601 may be configured to accept a voltage supplied from the host that is used for writing data to flash memory 116.

Memory system 102 may include two or more sets of data latches that may be considered together as an on-chip cache 614. "On-chip" here indicates that the data latches are on the same chip as flash memory 116. The on-chip cache may also be considered to be a buffer for flash memory 116, and a memory having such a buffer may be referred to as a buffered memory. In the illustrated embodiment, data latches 610 and 612 may be connected to bit lines so that the data to be written to a page is stored in a set of data latches which form a page buffer. Thus, the sets of data latches shown form two page buffers 610, 612, each of which contains data to be written to one page of flash memory 116. In some examples, data for a lower page may be held in one page buffer, which may be referred to as a lower page data latch, or LDL. Similarly, data for an upper page may be held in another page buffer, which may be referred to as an upper page data latch, or UDL. The on-chip cache may also include external data latch 605 which, as illustrated, may be disposed between, and communicatively coupled to each of controller 118 on the one hand and to data latches 610 and 612 on the other. The controller 118 also includes a volatile memory (controller RAM 616) which may be used to store data from the host prior to storing it in the memory array.

On-chip cache 614 may be configured to concurrently retain, safe copies of portions of data to be written to flash memory 116 until those portions are confirmed as having been written to flash memory 116. For example, a safe copy of at least a portion of a first sector of upper-page data and a safe copy of at least a portion of a second sector of lower-page data may be retained until the first sector of upper-page data and the second sector of lower-page data is confirmed as written to flash memory 116. As further example, a safe copy of at least a portion of the second sector of lower-page data may be retained until the second sector of lower-page data is confirmed as written to flash memory 116.

When host-supplied memory voltage exhibits a droop such that, instead of complying with a lower voltage limit of 2.7 volts, for example, the memory voltage droops, to a value less than 2.7 volts, a write interrupt protocol may be invoked. The present inventors have appreciated that memory controller 118 may be configured to control a response to such an event, where the response includes determining whether the droop has terminated, that is, whether the host-supplied memory voltage has returned to being within an acceptable range. After verifying that the host-supplied memory voltage is within the acceptable range, the response may include writing to flash memory 116 one or more of the safe copy of the portion of the first sector of upper-page data and the safe copy of the portion of the second sector of lower-page data. Memory controller 118 may then terminate the write-interrupt and resume receiving new data from the host.

Advantageously, memory controller 118 may avoid outputting an error signal to the host.

Figures 7A, 7B:
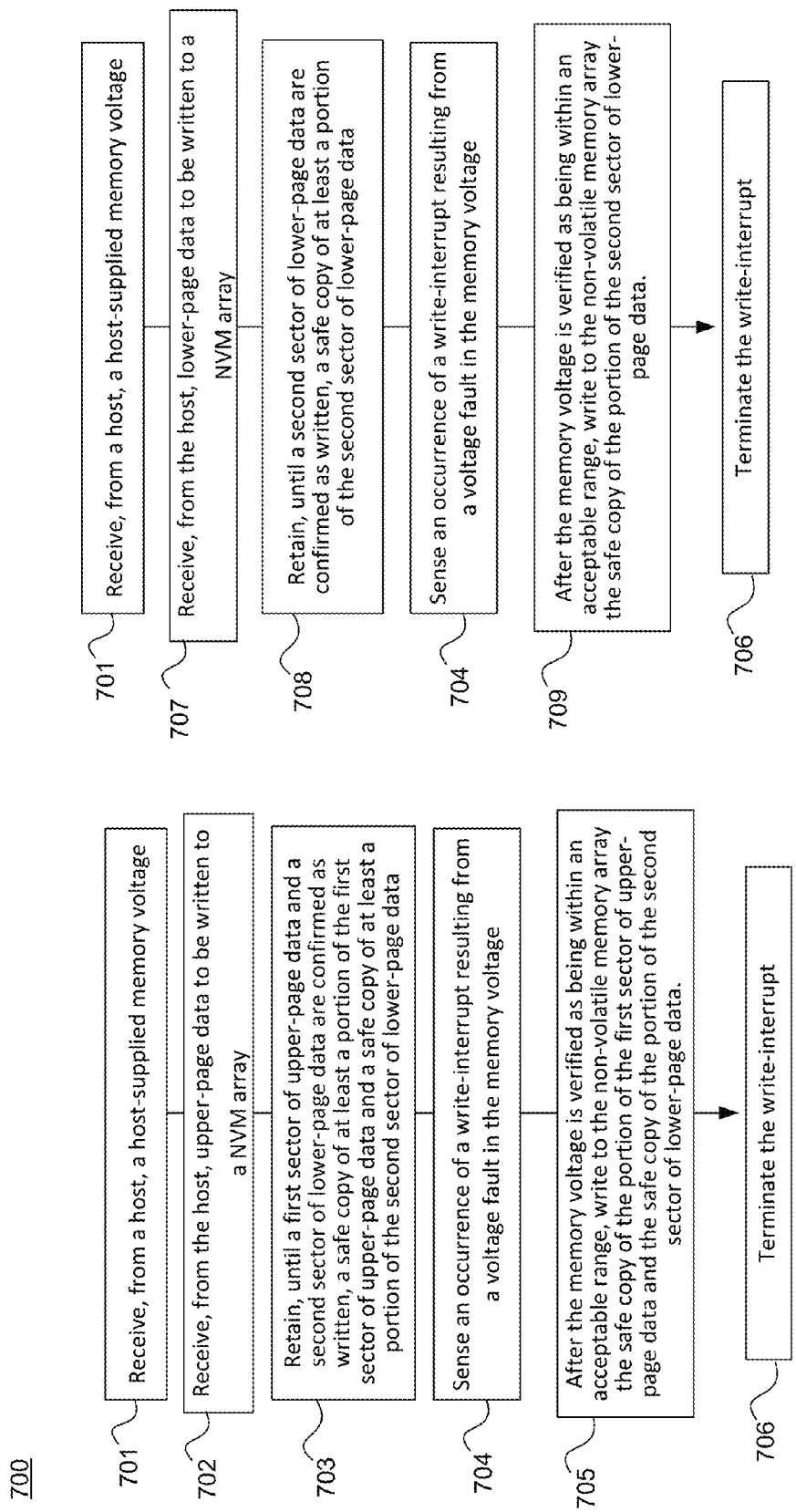
FIG. 7A and FIG. 7B illustrate a flow diagram illustrating an example of a method for recovering from a write interrupt resulting from a voltage fault according to an embodiment.

FIG. 7A and FIG. 7B illustrate example flow charts of a sequence of operations 700, according to the presently disclosed techniques, for recovering from a write interrupt resulting from a voltage fault.

Referring now to FIG. 7A, a recovery technique appropriate when the write interrupt is invoked during receipt of upper-page data will be described. At block 701, a host-supplied memory voltage may be received. The host-supplied memory voltage may have a specified upper and lower limit. For example, memory voltage may have a specified lower limit of 2.7 volts and may be received, via host interface 601 (FIG. 6) from host system 100 (FIG. 1).

At block 702, upper-page data to be written to a non volatile memory array may be received from the host. For example data to be written to flash memory 116 may be received from host system 100, and the method may proceed to block 703.

At block 703, a safe copy of at least a portion of the first sector of upper-page data and a safe copy of at least a portion of the second sector of lower-page data may be retained, until a first sector of upper-page data and a second sector of lower-page data are confirmed as written. For example, the safe copy of the portion of the first sector of upper-page data and the safe copy of the portion of the second sector of lower-page data may be retained in on chip cache 614 (FIG. 6) and the method may proceed to block 704.

At block 704, an occurrence of a write-interrupt resulting from a voltage fault in the host supplied memory voltage may be sensed. For example, a write interrupt protocol may have been invoked due to droop of the memory voltage below a specified limit, such as, for example, 2.7 volts. In an embodiment, the voltage fault is voltage value below a minimum specified regulated memory voltage and above a reset voltage value. Invocation of the write-interrupt protocol may be controlled and/or sensed by memory controller 118, and the method may proceed to block 705.

At block 705, after the memory voltage is verified as being within an acceptable range, the safe copy of the portion of the first sector of upper-page data and the safe copy of the portion of the second sector of lower-page data may be written to the non-volatile memory array. For example, memory controller 118 may verify that the host-supplied memory voltage is being maintained within an acceptable range. In an embodiment, memory controller 118 may verify that a hard reset has not occurred. Subsequently, memory controller 118 may cause at least a portion of the safe copies retained in on chip cache 614 (FIG. 6) to be written to flash memory 116, and the method may proceed to block 706.

At block 706, the write-interrupt may be terminated by, for example, memory controller 118. Advantageously, outputting of an error signal to the host is avoided, and termination of the write-interrupt enables receiving new data from the host.

Referring now to FIG. 7B, a recovery technique appropriate when the write interrupt is invoked during receipt of lower-page data will be described. At block 701, as indicated above, the host-supplied memory voltage may be received.

At block 707, lower-page data to be written to the non volatile memory array may be received from the host. For example data to be written to flash memory 116 may be received from host system 100, and the method may proceed to block 708.

At block 708, a safe copy of at least a portion of a second sector of lower-page data may be retained, until the second sector of lower-page data is confirmed as written. For example, the safe copy of the portion of the second sector of lower-page data may be retained in on chip cache 614 (FIG. 6) and the method may proceed to block 704.

At block 704, an occurrence of a write-interrupt resulting from a voltage fault in the host supplied memory voltage may be sensed, as indicated above.

At block 709, after the memory voltage is verified as being within an acceptable range, the safe copy of the portion of the second sector of lower-page data may be written to the non-volatile memory array. For example, memory controller 118 may verify that the host-supplied memory voltage is being maintained within an acceptable range. In an embodiment, memory controller 118 may verify that a hard reset has not occurred. Subsequently, memory controller 118 may cause at least a portion of the safe copies retained in on chip cache 614 (FIG. 6) to be written to flash memory 116, and the method may proceed to block 706.

At block 706, the write-interrupt may be terminated as indicated above.

Figure 8A:
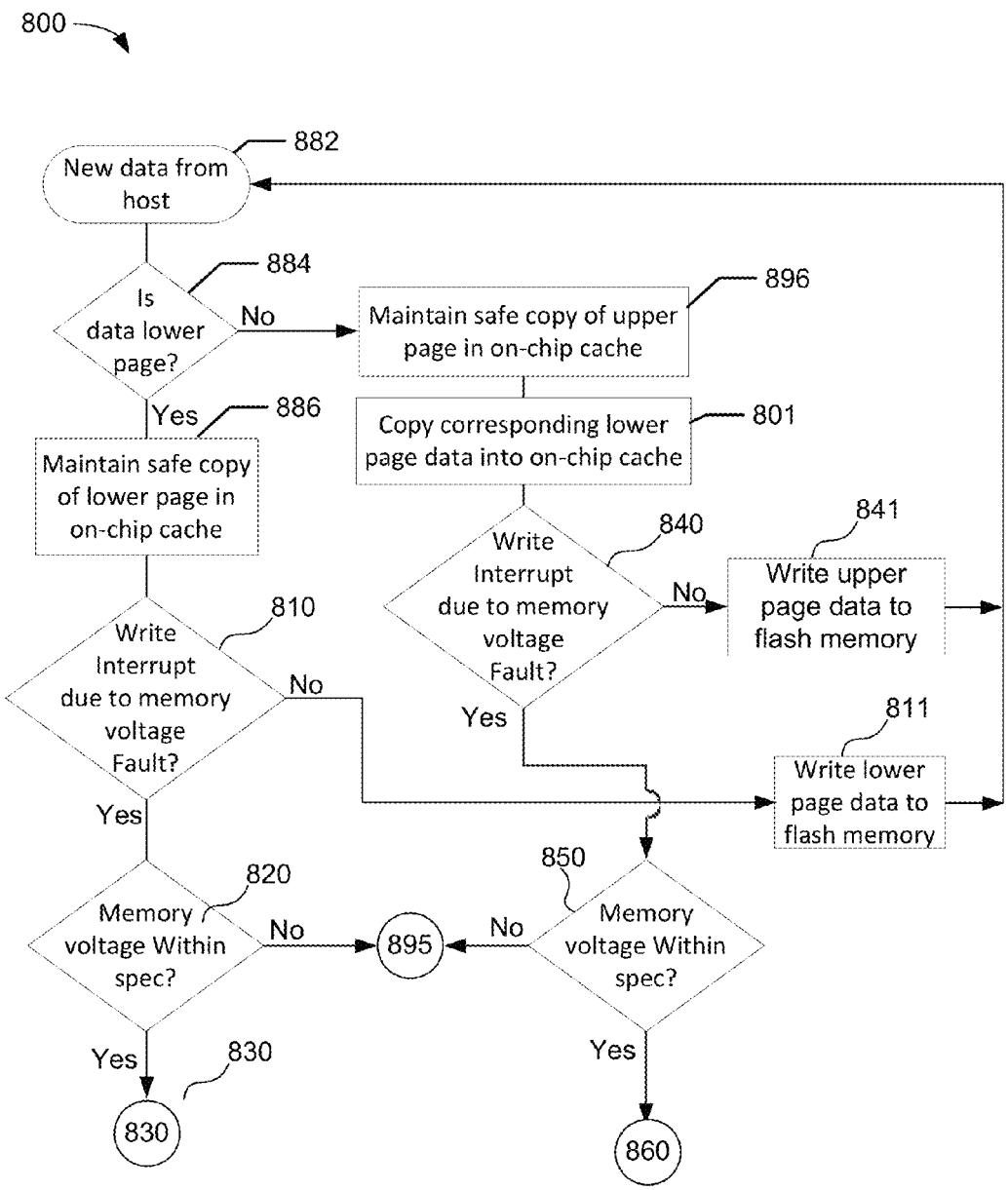
FIG. 8A, FIG. 8A, and FIG. 8C illustrate a flow diagram of an example of a method for recovering from a write interrupt resulting from a voltage fault according to an embodiment.
Figure 8B:
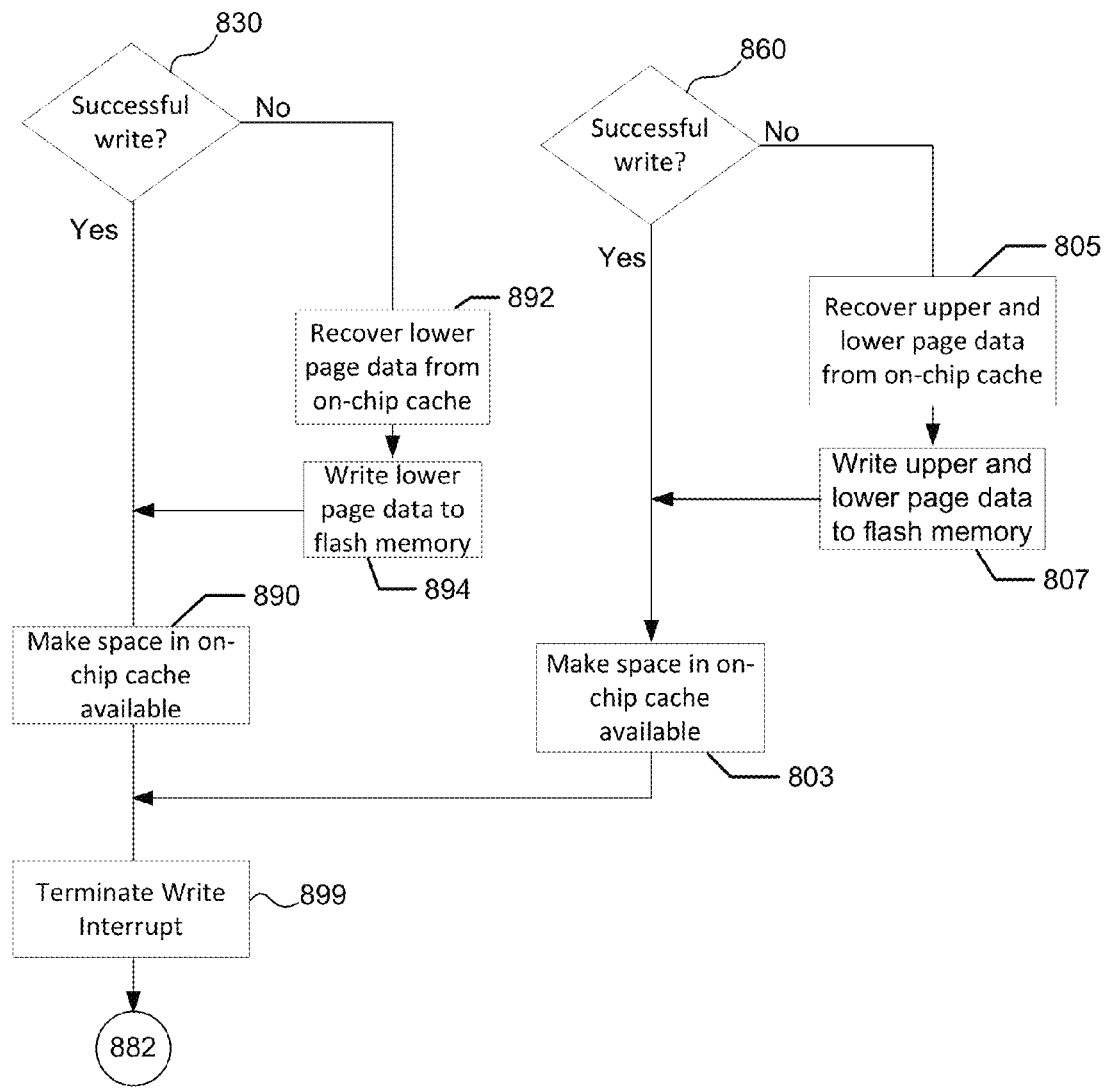

FIG. 8A and FIG. 8B show a flowchart for a write interrupt recovery method 800 according to an embodiment. New data may be received, block 882, from a host and a determination may be made, block 884, as to whether the data is lower-page data. If the data is lower page data, then a safe copy of the data may be maintained, block 886, in the on-chip cache. For example, a safe copy of the data may be maintained in on-chip cache 614 (FIG. 6), and the method may proceed to block 810.

At block 810, a determination may be made as to whether a write interrupt protocol has been invoked as a result of host-supplied memory voltage fault. If the determination is that a write interrupt has not been invoked, the method may proceed, at block 811, to write lower page data to flash memory. For example, lower page data may be written to flash memory 116 (FIG. 6). However, if the determination at block 810 is that a fault interrupt due to memory voltage fault has occurred, the method may proceed to block 820.

At block 820, a determination may be made as to whether the host-supplied memory voltage is within a specified region. For example, it may be determined whether the host-supplied memory voltage is above a minimum requirement of, for example, 2.7 volts. In an implementation, the determination may also be based on voltage stability, e.g., whether the host-supplied memory voltage is sustained above the minimum requirement for a specified time, such as 1 msec, for example. If the determination is negative, the method may be paused and/or aborted at block 895. For clarity of illustration, FIG. 8A omits the numerous possible contents of block 895, which are briefly summarized as follows: Block 895 may include a delay process, whereby after a certain period of time, block 820 is re-entered. There may be a cycle count block that, for example, permits a reentry to block 820 from block 895 to occur no more than a specific number of times, following which the method is aborted and/or an error message is sent to the host. In another embodiment, block 895 may simply terminate the method, with or without sending an error signal to the host.

If the determination at block 820 is that the memory voltage is within specification, the method may proceed to block 830. Referring now to FIG. 8B, at block 830 a determination may be made as to whether write of a current sector of data from on-chip cache to the flash memory has been successfully executed. When the writing is confirmed as successful, then the safe copy of the data in on-chip cache is no longer needed. Space thereon may then be made available, at block 890, for additional data, and the method may proceed to block 899.

At block 899, the write interrupt may be terminated, and the method may return to block 882 (FIG. 8A). Execution of block 899 signifies completion of recovery from the write interrupt event, and may, advantageously, avoid inclusion to a step of sending an error message to the host.

If, at block 830, the data is not confirmed as successfully written (write fail), then the lower-page data may be recovered, at block 892, from on-chip cache 614, and written, at block 894, to flash memory 116. Following block 894, the method may proceed to block 890 and subsequent blocks, as indicated above.

Referring again to FIG. 8A, If a determination is made at block 884 that the data is not lower-page data, i.e. is upper-page or middle-page data, then a copy of the data may be maintained, block 896, as a safe copy in on-chip cache 614. Because lower-page data may be unrecoverable from the memory array if a write fail occurs during programming of upper page data, the lower-page data is copied, block 801, to the on-chip cache prior to programming of upper-page data. Also, any middle-page data that might be affected may be copied to on-chip cache at this stage.

At block 840, a determination may be made as to whether a write interrupt protocol has been invoked as a result of host-supplied memory voltage fault. If the determination is that a write interrupt has not been invoked, the method may proceed, at block 841, to write upper page data to flash memory. For example, upper and lower page data may be written to flash memory 116. However, if the determination at block 840 is that a fault interrupt due to memory voltage fault has occurred, the method may proceed to block 850.

At block 850, a determination may be made as to whether the host-supplied memory voltage is within a specified region. For example, it may be determined whether the host-supplied memory voltage is above a minimum requirement of, for example 2.7 volts. In an implementation, the determination may also be based on voltage stability, e.g., whether the host-supplied memory voltage is sustained above the minimum requirement for a specified time, such as 1 msec, for example. If the determination is negative, the method may be paused and/or aborted at block 895, possible contents of which block having been described above.

If the determination at block 850 is that the memory voltage is within specification, the method may proceed to block 860. Referring again to FIG. 8B, at block 860 a determination may be made as to whether write of a current sector of data from on-chip cache to the flash memory has been successfully executed. When the writing is confirmed as successful, then the safe copy of the data in on-chip cache is no longer needed. Space thereon may then be made available, at block 803, for additional data, and the method may proceed to block 899.

At block 899, the write interrupt may be terminated, and the method may return to block 882. Execution of block 899 signifies completion of recovery from the write interrupt event, and may, advantageously, avoid inclusion to a step of sending an error message to the host.

If the data is not confirmed as successfully written (write fail), then the upper and lower-page data may be recovered, at block 805, from on-chip cache 614, and written, at block 807, to flash memory 116. Following block 807, the method may proceed to block 889 and subsequent blocks, as described above.

Figure 8C:
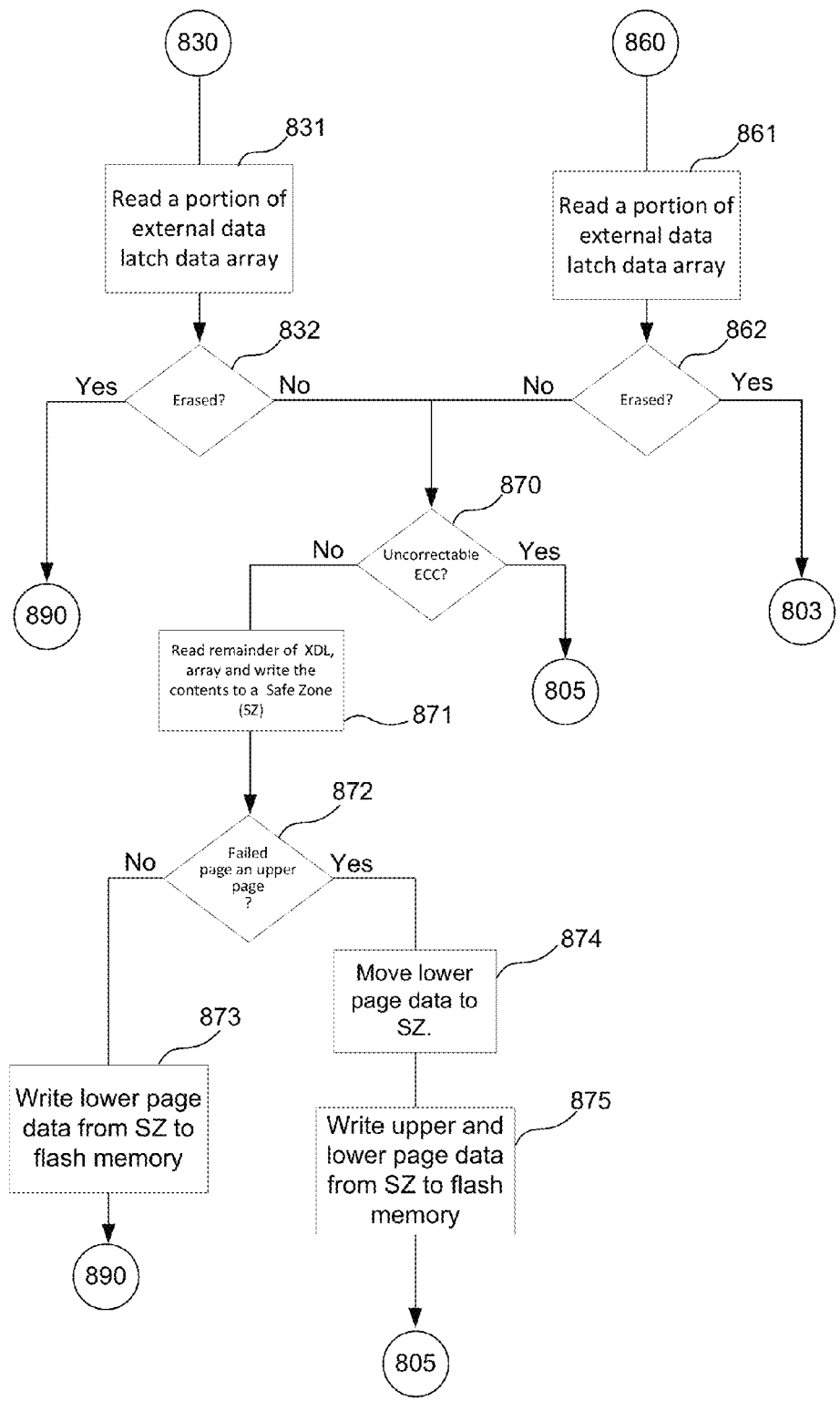

Referring now to FIG. 8C, another embodiment of method 800 will be illustrated. According to the illustrated embodiment, following a determination that memory voltage is within specification (blocks 820 or 850 of FIG. 8A), a portion of data in an external data latch is read (block 831 following block 830, or block 861 following block 860). The portion of data may be read from external data latch 605 (FIG. 6) for example. In an embodiment, for example, external data latch may store one page of data representing 8-16 kB of data. The portion being read at block 831 or 861 may represent about 1-4 kB of data, on one embodiment.

A determination may then be made (at block 832, following block 831, or block 862, following block 861) whether the read portion of the external data latch data array has been erased. If a determination is made at block 832 that the read portion has been erased, the method may proceed to block 890 (FIG. 8B), because no data recovery is required. Similarly, if a determination is made at block 862, that the read portion has been erased, the method may proceed to block 803 (FIG. 8B), because no data recovery is required.

If a determination is made at either of block 832 or block 862 that the read portion has not been erased, data recovery is needed and the current page may be characterized as a "failed page", and the method may proceed to block 870. At block 870 a determination may be made as to whether the portion of data includes data that is uncorrectable in view of an error correction code (ECC). If the determination results in a decision that at least some of the data is uncorrectable, the method may proceed to block 805 (FIG. 8B). If the determination results in a determination that the data is correctable in view of the ECC, the method may proceed to block 871.

At block 871, a remaining portion of data in the external data latch may be read and then written to a safe zone. At block 872, a determination may be made as to whether the failed page is an upper page. If the failed page is determined to be an upper page the method may proceed to block 874, and move lower-page data to the safe zone. At block 875, upper and lower-page data may be written from the safe zone to the flash memory. Subsequently, the method may proceed to block 805 (FIG. 8B).

If the determination is made at block 872 that the failed page is not an upper page, lower-page data may be written from the safe zone to flash memory, block 873. Subsequently the method may proceed to block 890 (FIG. 8B).

Thus, techniques for recovering from a write interrupt resulting from a voltage fault have been disclosed. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A memory device comprising:
a memory controller;
a non-volatile memory array for storing page data, the page data comprising upper-page data and lower-page data;
an on-chip cache configured to concurrently retain, until a first sector of upper-page data and a second sector of lower-page data are confirmed as written, a safe copy of at least a portion of the first sector of upper-page data and a safe copy of at least a portion of the second sector of lower-page data to be written to a respective group of cells of the memory array;
a host interface communicatively coupled with the memory controller and the non-volatile memory array, the host interface configured to accept a memory voltage supplied by a host for writing data to the non-volatile memory array; wherein,
the memory controller is configured to control a response to an occurrence of a write-interrupt resulting from a voltage fault in the memory voltage, the response comprising:
writing to the non-volatile memory array, after the memory voltage is verified as being within an acceptable range, one or more of the safe copy of the portion of the first sector of upper-page data and the safe copy of the portion of the second sector of lower-page data; and
terminating the write-interrupt.

2. The memory device of claim 1, wherein the response avoids outputting of an error signal to the host.

3. The memory device of claim 1, wherein terminating the write-interrupt comprises receiving new data from the host.

4. The memory device of claim 1, wherein the voltage fault comprises a voltage value below a minimum specified regulated memory voltage and above a reset voltage value.

5. The memory device of claim 4, wherein the response further comprises verifying, prior to writing to the non-volatile memory array, that a hard reset has not occurred.

6. The memory device of claim 5, wherein the response further comprises verifying, prior to writing to the non-volatile memory array, that the memory voltage is above the minimum specified regulated memory voltage.

7. The memory device of claim 1, wherein the non-volatile memory is configured as a single level cell memory.

8. The memory device of claim 1, wherein the non-volatile memory is configured as a multi-level cell memory, and the page data further comprises middle-page data.

9. The memory device of claim 1, further comprising a page buffer, including an upper page data latch and a lower page data latch communicatively coupled to the non-volatile memory array, and an external data latch communicatively coupled to the memory controller and the page buffer.

10. The memory device of claim 1, wherein the response further comprises reconstructing a full page of data from (i) one or both of the safe copy of the portion of the first sector of upper-page data and the safe copy of the portion of the second sector of lower-page data and (ii) a partial page written to the non-volatile memory array.

11. A method for controlling data transfer from a host to a nonvolatile memory array, the method comprising:

receiving page data, the page data comprising lower-page data and upper-page data from a host;

maintaining at least some of the lower-page data and the upper-page data in an on-chip cache configured to concurrently retain, until a first sector of upper-page data and a second sector of lower-page data are confirmed as written, a safe copy of at least a first portion of the first sector of upper-page data and a safe copy of at least a portion of the second sector of lower-page data to be written to a respective group of cells of the memory array;

accepting, at a host interface, a memory voltage supplied by the host for writing data to the non-volatile memory array, the host interface communicatively coupled with the memory controller and the non-volatile memory array;

sensing an occurrence of a write-interrupt resulting from a voltage fault in the memory voltage and, in response to the occurrence, writing to the non-volatile memory array, after the memory voltage is verified as being within an acceptable range, one or more of the safe copy of the portion of the first sector of upper-page data and the safe copy of the portion of the second section of lower-page data; and terminating the write-interrupt.

12. The method of claim 11, wherein the response avoids outputting of an error signal to the host.

13. The method of claim 11, wherein terminating the write-interrupt comprises receiving new data from the host.

14. The method of claim 11, wherein the voltage fault comprises a voltage value below a minimum specified regulated memory voltage and above a reset voltage value.

15. The method of claim 14, wherein the response further comprises verifying, prior to writing to the non-volatile memory array, that a hard reset has not occurred.

16. The method of claim 15, wherein the response further comprises verifying, prior to writing to the non-volatile memory array, that the memory voltage is above the minimum specified regulated memory voltage.

17. A non-transitory computer-readable storage medium having stored thereon instructions which, when executed by a controller, cause the controller to perform operations, the operations comprising:

receiving page data, the page data comprising lower-page data and upper-page data from a host;

maintaining at least some of the lower-page data and the upper-page data in an on-chip cache configured to concurrently retain, until a first sector of upper-page data and a second sector of lower-page data are confirmed as written, a safe copy of at least a first portion of the first sector of upper-page data and a safe copy of at least a portion of the second sector of lower-page data to be written to a respective group of cells of the memory array;

accepting, at a host interface, a memory voltage supplied by the host for writing data to the non-volatile memory array, the host interface communicatively coupled with the memory controller and the non-volatile memory array;

sensing an occurrence of a write-interrupt resulting from a voltage fault in the memory voltage and, in response to the occurrence, writing to the non-volatile memory array, after the memory voltage is verified as being within an acceptable range, one or more of the safe copy of the portion of the first sector of upper-page data and the safe copy of the portion of the second section of lower-page data; and terminating the write-interrupt.

18. The method of claim 17, wherein the response avoids outputting of an error signal to the host.

19. The method of claim 17, wherein terminating the write-interrupt comprises receiving new data from the host.

20. The method of claim 17, wherein the voltage fault comprises a voltage value below a minimum specified regulated memory voltage and above a reset voltage value.

* * * * *